United States Patent
Sugden et al.

(10) Patent No.: US 6,768,098 B1
(45) Date of Patent: Jul. 27, 2004

(54) FIBRE OPTIC GRATING SENSOR

(75) Inventors: Catherine A. Sugden, Birmingham (GB); Karen E. Chisholm, Birmingham (GB); Lin Zhang, Birmingham (GB)

(73) Assignee: Aston Photonic Technologies Limited, Birmingham (GB)

( * ) Notice: Subject to any disclaimer, the term of this patent is extended or adjusted under 35 U.S.C. 154(b) by 0 days.

(21) Appl. No.: 09/926,015

(22) PCT Filed: Feb. 17, 2000

(86) PCT No.: PCT/GB00/00566

§ 371 (c)(1),
(2), (4) Date: Jan. 24, 2002

(87) PCT Pub. No.: WO00/49378

PCT Pub. Date: Aug. 24, 2000

(30) Foreign Application Priority Data

Feb. 18, 1999 (GB) .............................................. 9903597

(51) Int. Cl.[7] .................................................. G01J 5/08
(52) U.S. Cl. ............................ 250/227.19; 250/227.28; 385/37
(58) Field of Search ....................... 250/227.19, 227.14, 250/227.15, 227.16, 227.27, 227.28, 227.23; 385/12, 37

(56) References Cited

U.S. PATENT DOCUMENTS

| | | | | |
|---|---|---|---|---|
| 5,384,884 A | * | 1/1995 | Kashyap et al. | ............ 385/129 |
| 5,469,520 A | | 11/1995 | Morey et al. | |
| 5,748,814 A | * | 5/1998 | Painchaud et al. | ............ 385/37 |
| 5,757,487 A | * | 5/1998 | Kersey | ........................ 356/450 |
| 5,760,391 A | * | 6/1998 | Narendran | ............. 250/227.14 |
| 5,818,987 A | * | 10/1998 | Bakhti et al. | ................. 385/28 |
| 5,838,437 A | * | 11/1998 | Miller et al. | ................ 356/478 |
| 6,021,242 A | * | 2/2000 | Harumoto et al. | ............ 385/37 |

FOREIGN PATENT DOCUMENTS

WO    WO 96/24079 A1    8/1996
WO    WO 98/36252 A1    8/1998

OTHER PUBLICATIONS

Rao, Yun–Jiang: "In Fibre Bragg Grating Sensors" Measurement Science and Technology, GB, IOP Publishing, Bristol, vol. 8, No. 4, Apr. 1, 1997 pp. 355–375.
Quetel et al: "Programmable Fiber Grating Based Wavelength Demultiplexer" Optical Fiber Communication, US, New York, IEEE, vol. CONG, 19, 1996, pp. 120–121.

* cited by examiner

*Primary Examiner*—Christopher W. Fulton
*Assistant Examiner*—Amy R Cohen
(74) *Attorney, Agent, or Firm*—Buckley, Maschoff & Talwalkar LLC

(57) ABSTRACT

A fiber optic grating sensor (10) comprising an optical fiber (12) in which a grating portion (14) is provided, the refractive index (16) of the fiber (12) varying periodically along the grating portion (14). The periodic variation of the refractive index (16) has an amplitude envelope which includes, in this example, two regions (24) in which the amplitude of the envelope is substantially reduced, and in this example is substantially nulled. The null regions (24) give the grating portion a spectral profile (20) within which there are, in this example two pass bands (18).

52 Claims, 2 Drawing Sheets

FIBRE OPTIC GRATING SENSOR

This invention relates to a fibre optic grating sensor, particularly but not exclusively a fibre optic grating strain or temperature sensor.

It Is known that fibre Bragg gratings may be used as a tool for measuring, for example, temperature and strain. The grating is formed in the fibre to reflect light at a wavelength which is determined by the physical characteristics of the grating. A change in the temperature and/or strain applied to a fibre Bragg grating changes the period of the grating and hence the wavelength of the light reflected by the grating. Arrays of fibre Bragg gratings, in which the gratings are spatially separated along a length of fibre and the spectral profiles of the gratings are separated in wavelength have been used to measure strain and temperature gradients by illuminating the array with broadband light and measuring the wavelength of the reflected light. A measurement of the wavelength shift (if any) provided by each grating provides information about the strain or temperature at that grating. Using a grating array to make a quasi-distributed strain or temperature measurement along a short length (about 5 cm or less) requires the fabrication of grating arrays comprising gratings of very short spatial length (generally less than 4 mm). For short length arrays, the spatial separation between adjacent gratings often becomes comparable to the spatial length of the gratings. In order to increase the number of gratings within the array the length of the gratings must be decreased, which rapidly increases the spectral bandwidth of the grating and hence reduces the spectral resolution of the sensor.

It Is an object of the present invention to provide an improved fibre optic grating sensor.

According to one aspect of the present invention there is provided a fibre optic grating sensor comprising an optical fibre having a grating portion along which the refractive index of the fibre varies periodically and at least substantially continuously to form an at least substantially continuous trating structure, the periodic variation having an amplitude envelope which includes at least one region in which the amplitude of the envelope is substantially reduced, the said variation giving the grating portion a spectral profile within which there is at least one pass band.

Preferably, the amplitude envelope includes at least one region in which the amplitude of the envelope is substantially nulled. The amplitude envelope preferably includes a plurality of regions in which the amplitude of the envelope is substantially nulled. Each null region desirably gives rise to a corresponding pass band.

Preferably, the periodic variation in the or each region includes a section in which the phase of the periodic variation substantially reverses, the or each reduction in the amplitude of the refractive index envelope and the or each corresponding phase reversal acting to give rise to a corresponding pass band within the spectral profile of the grating portion.

Adjacent null regions and hence adjacent sensor elements, are desirably spatially separated. Preferably each sensor element is independently actuable and hence the wavelengths of the corresponding pass bands are independently variable.

The grating portion preferably comprises two substantially superimposed fibre Bragg gratings. The amplitudes of the refractive index profiles of the two gratings preferably add together to form the amplitude envelope and the or each phase change.

The fibre Bragg gratings are preferably chirped fibre Bragg gratings. Desirably, the two chirped gratings have substantially the same rate of chirp and substantially the same spectral bandwidth, the first chirped grating having a different central wavelength to the second chirped grating. Alternatively, the first chirped grating has a different rate of chirp to the second chirped grating, and the two chirped gratings have substantially the same central wavelength and bandwidth.

Alternatively, the fibre Bragg gratings may be linear fibre Bragg gratings. The two linear gratings preferably have substantially the same spectral bandwidth. Desirably the first linear grating has a different central wavelength to the second linear grating.

The grating portion may alternatively comprise one fibre Bragg grating having a plurality of regions within which the refractive index profile of the grating is substantially reduced or nulled.

The fibre Bragg gratings are preferably fabricated using a known two-beam interference holographic fabrication method. Alternatively, the fibre Bragg gratings may be fabricated using a known phase-mask fabrication method.

The null regions in the single fibre Bragg grating are desirably formed in a fibre Bragg grating fabricated using the two-beam interference holographic fabrication method by providing an amplitude mask generally in front of the fibre, generally in the beam paths, during fabrication. Alternatively, the null regions in the single fibre Bragg grating may be formed in a fibre Bragg grating fabricated using the two-beam interference holographic fabrication method or the phase-mask fabrication method by subsequently further exposing regions of the grating. The single fibre Bragg grating may be a linear grating or a chirped grating.

The grating portion may further alternatively comprise a single grating structure fabricated using the phase-mask fabrication method. The desired grating structure is preferably represented on a phase-mask and subsequently inscribed into the fibre through the phase-mask. Alternatively, the grating structure may be inscribed in the fibre through a phase-mask, the fibre undergoing oscillating motion, along its longitudinal direction, relative to the phase-mask to thereby control the refractive index profile within the grating structure. The phase-mask may alternatively or additionally undergo oscillating motion relative to the fibre.

According to a further aspect of the present invention there is provided a fibre optic grating sensor comprising optical fibre having a grating portion along which the refractive index of the fibre varies periodically and at least substantially continuously to form an at least substantially continuous trating structure, the periodic variation including at least one section in which the phase of the periodic variation substantially reverses, the said variation giving the grating portion a spectral profile within which there is at least one pass band.

The grating portion preferably includes a plurality of sections in which the phase of the periodic variation substantially reverses. The or each phase reversal section desirably gives rise to a corresponding pass band. Adjacent phase reversal sections, and hence adjacent sensors, are desirably spatially separated. Preferably each sensor is independently actuable and hence the wavelengths of the corresponding pass bands are independently variable.

Preferably, the period of the periodic variation changes along at least part of the grating portion, and most preferably changes along substantially the full length of the grating portion.

The grating portion preferably comprises two substantially overlapping chirped fibre Bragg gratings, the first chirped grating being spatially shifted relative to the second chirped grating by an integer plus a fraction of the period of the first grating. The first chirped grating is preferably spatially shifted relative to the second chirped grating by an integer plus one half of the period of the first grating.

Desirably, the two chirped gratings have substantially the same rate of chirp and substantially the same spectral bandwidth, the first chirped grating having a different central wavelength to the second chirped grating. Alternatively, the first chirped grating has a different rate of chirp to the second chirped grating, and the two chirped gratings have substantially the same central wavelength and bandwidth.

The fibre Bragg gratings are preferably fabricated using a known two beam interference holographic fabrication method. Alternatively, the fibre Bragg gratings may be fabricated using a known phase-mask fabrication method.

Alternatively, the grating portion may comprise one chirped fibre Bragg grating having a plurality of sections in which the phase of the periodic variation substantially reverses.

The single chirped fibre Bragg grating is preferably fabricated using a known phase-mask fabrication technique. Preferably, a first part of the chirped grating having a first spectral bandwidth is represented on a phase-mask and subsequently inscribed into the fibre. A second part of the chirped grating having a second spectral bandwidth is preferably inscribed into the fibre substantially spatially and spectrally adjacent the first part, the first and second parts together forming the chirped grating. Preferably, the chirped grating comprises a plurality of such parts arranged substantially spatially and spectrally sequentially adjacent one another.

Preferably, the fibre is under a first strain during inscription of the first part. The fibre is preferably under a second strain during subscription of the second part, the first and second strains being different.

The chirped grating may alternatively be fabricated using a single phase-mask, the desired structure of the chirped grating being represented on the phase-mask and subsequently inscribed into the fibre through the phase-mask.

The chirped grating may further alternatively be fabricated using a known continuous writing technique.

The optical fibre is preferably photosensitive enhanced optical fibre. The photosensitive enhanced optical fibre may be germania doped optical fibre, or boron-germania co-doped optical fibre. The germania doped fibre may be hydrogen loaded to further increase the photosensitivity of the fibre. The boron-germania co-doped fibre may be hydrogen loaded to further increase the photosensitivity of the fibre. The photosensitive enhanced optical fibre may alternatively be hydrogen loaded standard optical fibre. The hydrogen loaded fibre may be annealed following fabrication of the grating structure to substantially remove any residual hydrogen from the fibre.

The grating structure may further alternatively comprise a side-etched surface-relief grating structure, preferably fabricated in standard optical fibre.

The fibre grating sensor may comprise a plurality of grating portions.

A specific embodiment of the invention will now be described by way of example only, with reference to the accompanying drawings, in which.

Figure 1:
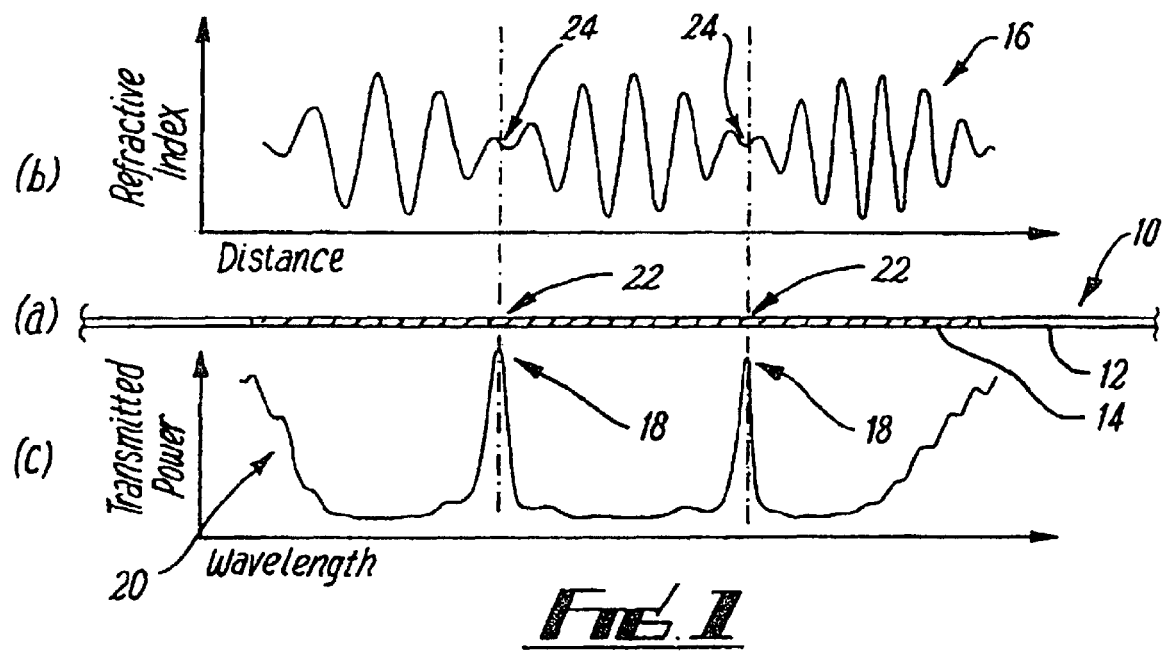
FIG. 1(a) is a diagrammatic representation of a fibre optic grating sensor according to the present Invention, comprising a Moiré grating.
FIG. 1(b) is a diagrammatic representation of the theoretical refractive index profile of the Moiré grating of figure 1(a)
FIG. 1(c) is a diagrammatic representation of the theoretical spectral profile of the Moiré grating of FIGS. 1 (a) and (b)

Referring to the drawings, there is provided a fibre optic grating sensor 10 comprising an optical fibre 12 in which a grating portion 14 is provided, the refractive index 16 of the fibre 12 varying periodically along the grating portion 14. The periodic variation of the refractive index 16 has an amplitude envelope which includes, in this example, two regions 24 in which the amplitude of the envelope is substantially reduced, and in this example is substantially nulled. The null regions 24 give the grating portion a spectral profile 20 within which there are, in this example, two pass bands 18.

While it is preferred that the amplitude envelope includes regions 24 in which the amplitude of the envelope is substantially nulled, it is sufficient that the amplitude of the envelope is merely significantly reduced. That is to say, the amplitude of the envelope must be sufficiently reduced to give rise to identifiable, and measurable, pass bands 18 within the spectral profile 20 of the grating portion 14. The pass bands 18 are required to be identifiable one from the other, and from any light present at other wavelengths.

In this example, the grating portion is a Moiré grating formed by the notional or actual superimposition of two Bragg gratings. Each Bragg grating is "chirped". That is, the period of the grating changes along its length, either in linear fashion, or in a more complex manner. The wavelength reflected by a chirped-period, or "chirped" grating will vary along the length of the grating. The variation will be linear in the case of linear chirp, and more complex in other cases. By contrast, a linear grating reflects substantially the same wavelength along the length of the grating. A chirped grating has a broader spectral bandwidth than a linear grating of the same length.

The Moiré grating 14 is fabricated using a known two-beam interference holographic fibre grating fabrication method. Two chirped-period fibre Bragg gratings are inscribed in the same section of fibre 12 by two sequential inscribing operations. The two chirped gratings are of substantially the same physical length and have substantially the same spectral bandwidth. However, the central wavelength of the first chirped grating is slightly shifted in wavelength relative to the central wavelength of the second chirped grating. The amplitudes of the refractive index profiles of the two superimposed chirped gratings add together to produce the refractive index profile 16 of the Moiré grating 14 and thereby form the amplitude envelope of the refractive index profile 16 along the fibre.

FIG. 1 illustrates how the refractive index profile 16 of a chirped Moiré grating 14 gives rise to pass bands 18 within the bandwidth of the spectral profile 20 of the Moiré grating 14, and to sensors 22 within the core of the optical fibre 12. In the regions within the amplitude envelope where nulls 24 occur, the grating strength is nulled. Where the grating strength is nulled no light is reflected by that region of the grating 14, and hence pass bands 18 are created.

The regions within the fibre core where the nulls 24 in the amplitude envelope, and in the grating strength, occur may act as sensors 22. The length of a sensor 22 is the length within the fibre core in which the grating strength is substantially reduced or nulled. The spectral profiles of the sensors 22 are therefore the spectral profiles of the pass bands 18. The spectral bandwidth of the pass bands 18 is determined by the strength and chirp-rate of the Bragg gratings which form the Moiré grating 14.

The exact position of each sensor 22 can be calculated from the spectral profile 20 of the Moiré grating 14, knowing the exact length of the Moiré grating 14 and the manner in which the grating is chirped. The approximate length of each sensor 22 can be calculated using the full width half maximum spectral bandwidth of the pass bands 18.

Each sensor 22 occurs at a respective position in wavelength space and is independently actuable. Consequently each pass band 18 is independently variable in wavelength, within the bandwidth of the spectral profile 20 of the Moiré grating 14, in accordance with the value of the parameter being measured at the site of the corresponding sensor 22.

Figure 2:
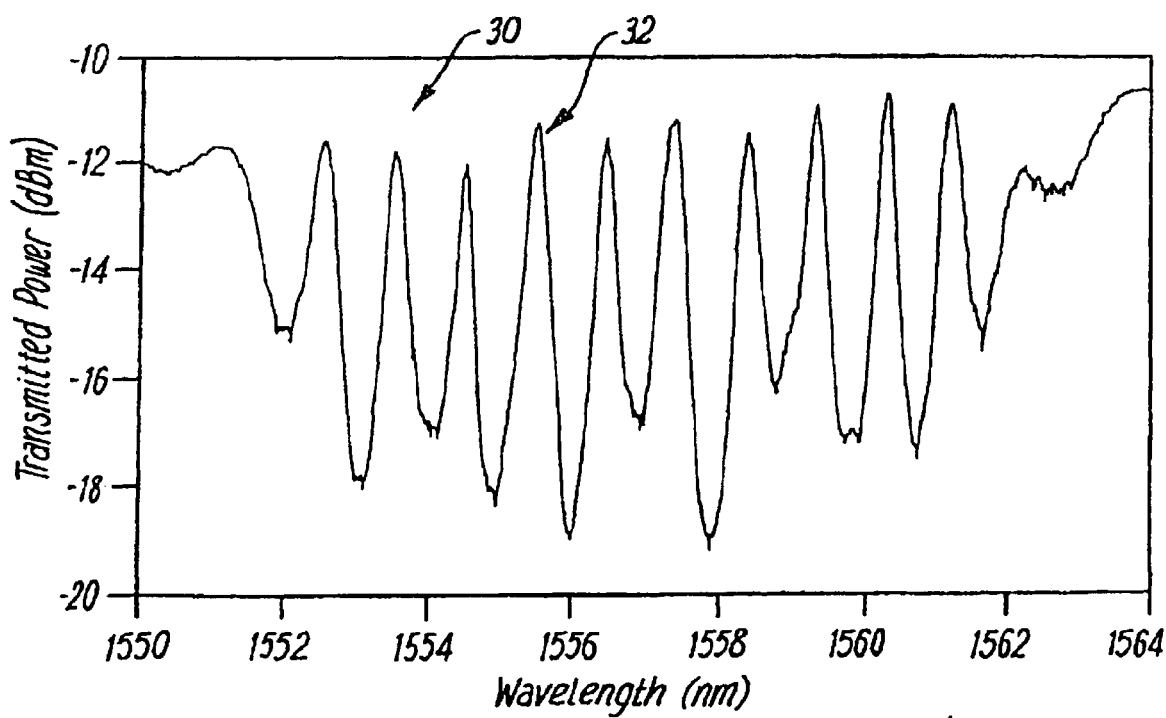
FIG. 2 shows the optical spectrum of a 10-pass band Moiré grating constructed according to the invention.

FIG. 2 shows the spectral profile 30 of a chirped Moiré grating which comprises .10 pass bands 32. The Moiré grating was fabricated using the two-beam interference holographic method. A frequency doubled Argon Ion laser of wavelength 244 nm was used and the Moiré grating was fabricated in hydrogen loaded germania doped optical fibre, such as that manufactured by Spectran. A first chirped fibre Bragg grating was fabricated having approximately 70% reflectivity, then a second chirped fibre Bragg grating of slightly different central wavelength was inscribed in the same piece of fibre. The wavelength shift between the two chirped gratings is 2 nm. The magnitude of the wavelength shift determines the number of pass bands 32 in the Moiré grating.

The length of the Moiré grating of FIG. 2 is approximately 6mm. The total spectral bandwidth is 12.6 nm. The average bandwidth of the pass bands 32 is 0.39 nm and the finesse is approximately 2.5. The approximate sensor length is less than 200 $\mu$m.

Figure 3:
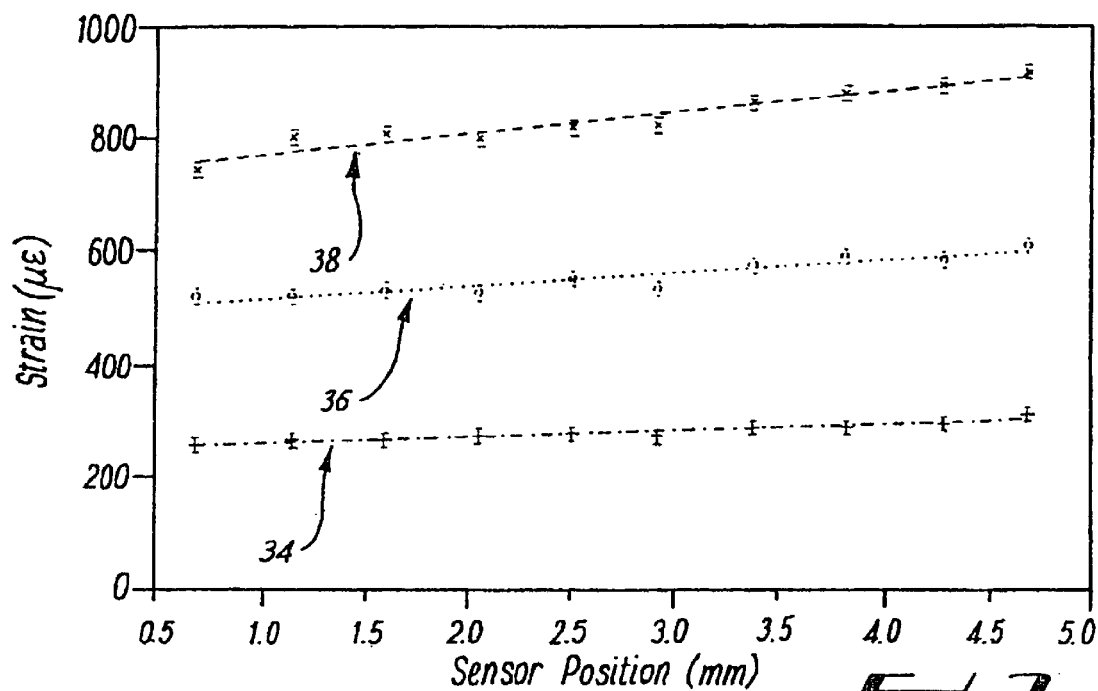
FIG. 3 shows linear-strain-gradient measurements taken using the grating of FIG. 2.

FIG. 3 shows strain measurement results taken using the 10 peak Moiré grating of FIG. 2. The measurements show how the strain varies along the length of the Moiré grating. The Moiré grating was bonded into grooves on a piece of spring steel (not shown). The steel was bent using a 4-point bending rig in order to effect a linear strain gradient along the Moiré grating. FIG. 3 shows the strain measurements taken using the Moiré grating with the steel plate bent by three different amounts, to produce three different strain gradients.

The wavelengths of the pass bands 32 were measured in transmission using a tuneable laser and optical spectrum analyser, giving a measurement resolution of 0.01 nm. The light from the tuneable laser was launched into a fibre grating sensor 10 comprising the 10 pass band Moiré grating and light transmitted by the Moiré grating was detected and measured using the optical spectrum analyser. The wavelength of the tuneable laser was tuned across the spectral bandwidth of the Moiré grating in order to interrogate in turn the sensor corresponding to each pass band 32.

The change in the central or peak wavelengths of the pass bands 32, between the unstrained starting state and the strained states, is calculated. The equivalent axial strain on each sensor is then calculated from the fractional change in the central wavelength ($\lambda_B$) of the corresponding pass band 32 of each sensor, using:

$$\Delta\lambda_B/\lambda_B=(1-p_e)\epsilon$$

where $p_e$ is the effective photosilicate constant, which is 0.22 for germanosilicate fibre, and $\epsilon$ is the applied axial strain.

The measurements 34 recorded for the steel plate bent by a first amount indicated that a linear strain gradient of 12.1 $\mu\epsilon$/mm was present across the Moiré grating. The measurements 36 recorded for the steel plate bent by a second amount indicated that a linear strain gradient of 23.4 $\mu\epsilon$/mm was present across the Moiré grating. The measurements 38 recorded for the steel plate bent by a third amount indicated that a linear strain gradient of 38.2 $\mu\epsilon$/mm was present across the Moiré grating.

The measurements recorded using this 10 pass band Moiré grating have a strain resolution of 8 $\mu\epsilon$ and a spatial resolution of approximately 450 $\mu\epsilon$m.

Figure 4:
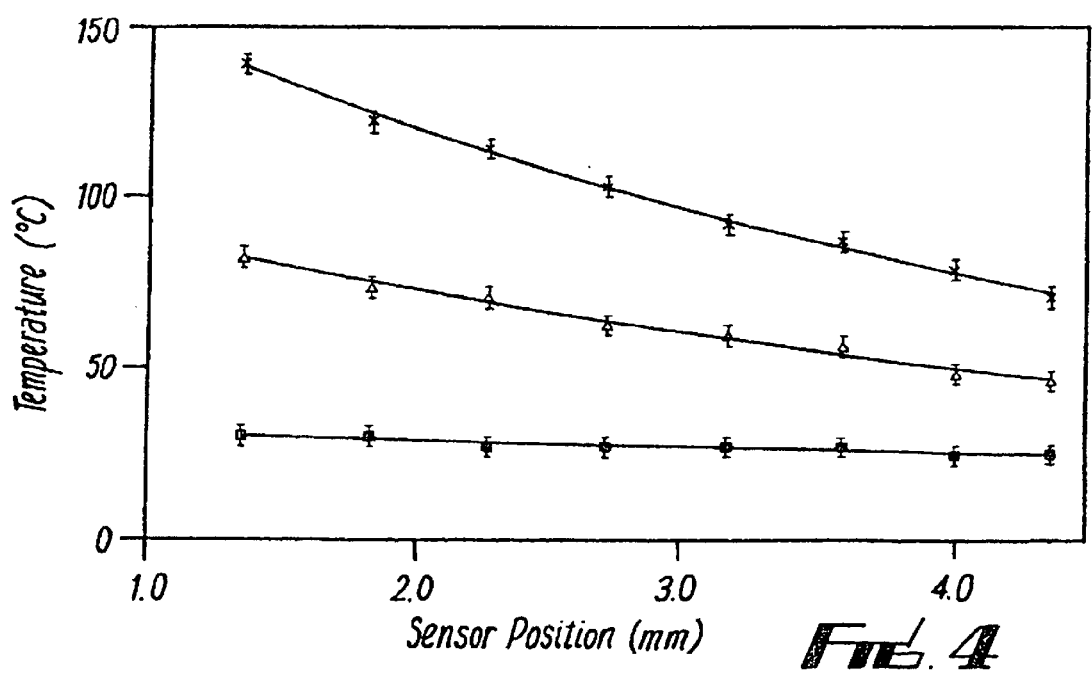
FIG. 4 shows exponential-temperature-gradient measurements taken using an 8-pass band Moiré grating constructed according to the invention.

FIG. 4 shows exponential temperature gradient measurements taken using a 8 pass band Moiré grating. The grating was fabricated using the two-beam interference holographic method, as described above. The spectral bandwidth of the Moiré grating is 12.8 nm and the wavelength shift between the two chirped gratings is 2.5 nm. The measurements show how the temperature varies along the length of the Moiré grating. One end of the Moiré grating was bonded horizontally to a hot plate, to provide an exponentially decaying temperature gradient with distance away from the hot plate, and along the Moiré grating.

The Moiré grating was interrogated generally as described above, using broadband Erbium fluorescence source and an optical spectrum analyser, giving a measurement resolution of 0.08 nm which corresponds to a temperature resolution of approximately 6° C. The change in the central wavelength ($\lambda_B$) is calculated for each pass band. The equivalent axial temperature is then calculated using:

$$\Delta\lambda_B/\lambda_B=(a+\xi)\Delta T$$

where a is the thermal expansion co-efficient of the optical fibre (0.55×10$^{-6}$ for fused silica), $\xi$ is the thermo-optic coefficient (approximately 8.3×10$^{-6}$ for germania-doped silica) and $\Delta T$ is the applied temperature change.

By way of comparison, a linear fibre Bragg grating of the same length (200 $\mu$m), with a maximum transmission loss of 7 dB, would have a full width half maximum spectral bandwidth of more than 5 nm. Hence an array of ten such linear gratings would have a spectral bandwidth of more than 50 nm. Use of, for example, the 10 pass band Moiré grating therefore reduces the required operating spectral bandwidth by more than 40 nm.

The sensor length can be considered to be very short. Because the nulls in the refractive index profile define the pass band, this allows quasi-point measurements to be made and thus provides for high spatial resolution measurements. This short sensor length also enables a large number of measurements, of for example strain or temperature, to be taken over a small distance, such as 5–20mm, and within a single grating structure. Thus a greater spatial and spectral resolution is provided than for an equivalent number of discrete linear fibre Bragg gratings. Both linear and non-linear gradients of a chosen measured can be measured.

Various modifications can be made without departing from the scope of the invention. For example, the grating portion may be a different type of grating to that described, and may be fabricated in a single step, for instance by using a known phase-mask fabrication method or a known side-etched surface-relief grating fabrication method. Using the phase-mask fabrication method, the grating portion structure may be represented on a phase-mask and directly inscribed in the fibre through the phase-mask. Alternatively, the grating portion may be inscribed in the fibre through a phase-mask, the phase-mask and/or the fibre be oscillated along their longitudinal direction during fabrication to thereby control the refractive index profile within the grating portion.

The Moiré gratings can be formed as two superimposed Bragg gratings of different central wavelength or chirp. Two gratings which vary slightly in bandwidth and/or central wavelength and/or chirp rate and/or the amount of physical overlap between the gratings will give rise to periodic nulls when superimposed, and are thus likely to be of use in sensing applications. Alternatively, the profile of the Moiré grating could be devised to provide a plurality of nulls, without necessarily being reproducable by superimposing two gratings. Thus, the invention extends beyond the use of Moiré gratings, which would conventionally be considered to be the result of the superimposition of two grating structures. The grating structure may also be a single linear or chirped fibre Bragg grating in which parts of the grating are amplitude masked out during fabrication or are erased by further exposing sections of the grating following fabrication.

It will be appreciated that the grating structure may be fabricated in many different types of photosensitive enhanced optical fibre, other than that described, including Boron-germania co-doped fibre, and hydrogen loaded standard fibre. It will also be appreciated that the grating structures can be fabricated at a wide range of different central wavelengths, to suit a particular optical source and optical detector. This will to some extent affect which type of fibre the grating structure is fabricated in.

Grating portions or different length, bandwidth and number of pass bands may be used. More than one grating portion may be provided within a fibre grating sensor.

What is claimed is:

1. A fibre optic grating sensor comprising an optical fibre having a grating portion along which the refractive index of the fibre varies periodically during transmission, the periodic variation having an amplitude envelope which includes at least one region in which the amplitude of the envelope is substantially reduced, the variation giving the grating portion a spectral profile within which there is at least one pass band.

2. A sensor according to claim 1 in which the amplitude envelope includes a plurality of regions in which the amplitude of the envelope is substantially reduced.

3. A sensor according to claim 2 in which the amplitude envelope includes a plurality of regions in which the amplitude of the envelope is substantially nulled.

4. A sensor according to claim 2 in which the periodic variation in at least one of the regions includes a section in which the phase of the periodic variation substantially reverses.

5. A sensor according to claim 2 in which adjacent regions are spatially separated.

6. A sensor according to claim 2 in which at least one region gives rise to a corresponding pass band.

7. A sensor according to claim 6 in which each region is an independently actuable sensor element operable to vary the wavelength of the corresponding pass band in response to a change in a parameter being measured.

8. A sensor according to claim 1 in which the grating portion comprises two substantially superimposed fibre Bragg gratings.

9. A sensor according to claim 8 in which the amplitudes of the refractive index profiles of the two gratings add together to form the amplitude envelope.

10. A sensor according to claim 8 in which the fibre Bragg gratings are chirped fibre Bragg gratings.

11. A sensor according to claim 10 in which the two chirped gratings have substantially the same rate of chirp and substantially the same spectral bandwidth, the first chirped grating having a different central wavelength than the second chirped grating.

12. A sensor according to claim 10 in which the first chirped grating has a different rate of chirp than the second chirped grating, and the two chirped gratings have substantially the same central wavelength and bandwidth.

13. A sensor according to claim 8 in which the fibre Bragg gratings are linear fibre Bragg gratings.

14. A sensor according to claim 13 in which the two linear gratings have substantially the same spectral bandwidth.

15. A sensor according to claim 14 in which the first linear grating has a different central wavelength than the second linear grating.

16. A sensor according to claim 8 in which at least one fibre Bragg grating is fabricated using a two-beam interference holographic fabrication method.

17. A sensor according to claim 8 in which at least one fibre Bragg grating is fabricated using a phase-mask fabrication method.

18. A sensor according to claim 16 in which at least one region in the fibre Bragg grating is formed in a fibre Bragg grating fabricated using the two-beam interference holographic fabrication method by providing an amplitude mask generally in front of the fibre, generally in the beam paths, during fabrication.

19. A sensor according to claim 17 in which at least one region in the fibre Bragg grating is formed in a fibre Bragg grating fabricated using one of the two-beam interference holographic fabrication method and the phase-mask fabrication method by further exposing regions of the grating.

20. A sensor according to claim 1 in which the grating portion comprises one fibre Bragg grating having a plurality of regions within which the refractive index profile of the grating is substantially reduced or nulled.

21. A sensor according to claim 20 in which the fibre Bragg grating is a linear grating or a chirped grating.

22. A sensor according to claim 1 in which the grating portion comprises a single grating structure fabricated using a phase-mask fabrication method.

23. A sensor according to claim 22 in which the desired grating structure is represented on a phase-mask and inscribed into the fibre through the phase-mask.

24. A sensor according to claim 22 in which the grating structure is inscribed in the fibre through a phase-mask while the fibre undergoes oscillating motion along its longitudinal direction, relative to the phase-mask, to thereby control the refractive index profile within the grating structure.

25. A sensor according to claim 1 in which the grating portion comprises a surface-relief grating structure side-etched in an optical fibre.

26. A fibre optic grating sensor comprising an optical fibre having a grating portion along which a refractive index of the fibre varies periodically during transmission, the periodic variation including at least one section in which the phase of the periodic variation substantially reverses, the s variation giving the grating portion a spectral profile within which there is at least one pass band.

27. A sensor according to claim 26 in which the grating portion includes a plurality of sections in which the phase of the periodic variation substantially reverses.

28. A sensor according to claim 27 in which adjacent phase reversal sections are spatially separated.

29. A sensor according to claim 27 in which at least one phase reversal section gives rise to a corresponding pass band.

30. A sensor according to claim 29 in which each section is an independently actuable sensor element operable to vary the wavelength of the corresponding pass band in response to a change in a parameter being measured.

31. A sensor according to claim 26 in which the period of the periodic variation changes along substantially the full length of the grating portion.

32. A sensor according to claim 26 in which the grating portion comprises two substantially overlapping chirped fibre Bragg gratings, the first chirped grating being spatially shifted relative to the second chirped grating by an integer plus a fraction of the period of the first grating.

33. A sensor according to claim 30 in which the first chirped grating is spatially shifted relative to the second chirped grating by an integer plus one half of the period of the first grating.

34. A sensor according to claim 30 in which the two chirped gratings have substantially a same rate of chirp and substantially a same spectral bandwidth, the first chirped grating having a different central wavelength than the second chirped grating.

35. A sensor according to claim 30 in which the first chirped grating has a different rate of chirp than the second chirped grating, and the two chirped gratings have substantially the same central wavelength and bandwidth.

36. A sensor according to any of claim 30 in which the fibre Bragg gratings are fabricated using a known two-beam interference holographic fabrication method.

37. A sensor according to claim 30 in which the fibre Bragg gratings may be fabricated using a known phase-mask fabrication method.

38. A sensor according to claim 26 in which the grating portion comprises one chirped fibre Bragg grating having a plurality of sections in which the phase of the periodic variation substantially reverses.

39. A sensor according to claim 38 in which the single chirped fibre Bragg grating is fabricated using a known phase-mask fabrication technique.

40. A sensor according to claim 39 in which a first part of the chirped grating is represented on a phase-mask and inscribed into the fibre, the first part of the chirped grating having a first spectral bandwidth.

41. A sensor according to claim 40 in which a second part of the chirped grating having a second spectral bandwidth is inscribed into the fibre substantially spatially and spectrally adjacent the first part, the first and second parts together forming the chirped grating.

42. A sensor according to claim 41 in which the chirped grating comprises a plurality of such parts arranged substantially spatially and spectrally sequentially adjacent one another.

43. A sensor according to claim 41 in which the fibre is under a first strain during inscription of the first part and is under a second strain during inscription of the second part, the first and second strains being different.

44. A sensor according to claim 40 in which the fibre is under a first strain during inscription of the first part.

45. A sensor according to claim 38, in which the chirped grating is fabricated using a single phase-mask, the desired structure of the chirped grating being represented on the phase-mask and inscribed into the fibre through the phase-mask.

46. A sensor according to claim 38 in which the chirped grating is fabricated using a known continuous writing technique.

47. A sensor according to claim 26 in which the optical fibre is photosensitive enhanced optical fibre.

48. A sensor according to claim 47 in which the fibre is hydrogen loaded to increase the photosensitivity of the fibre.

49. A sensor according to claim 48 in which the hydrogen loaded fibre is annealed following fabrication of the grating structure to substantially remove any residual hydrogen from the fibre.

50. A sensor according to claim 47 in which the photosensitive enhanced optical fibre is germania doped optical fibre, or boron-germania co-doped optical fibre.

51. A sensor according to claim 26 in which the fibre grating sensor comprises a plurality of grating portions.

52. A sensor according to claim 26 in which the grating portion comprises a surface-relief grating structure side-etched in an optical fibre.

* * * * *